United States Patent
Cheng et al.

(10) Patent No.: US 6,768,523 B2
(45) Date of Patent: Jul. 27, 2004

(54) SLIDABLY DETACHABLE MOBILE PHONE DISPLAY UNIT

(75) Inventors: Yung-Fa Cheng, Taipei (TW); Lu-Long Tsao, Taipei (TW); Kuo-Hsiang Wu, Taipei (TW)

(73) Assignee: Quanta Computer, Inc. (TW)

(*) Notice: Subject to any disclaimer, the term of this patent is extended or adjusted under 35 U.S.C. 154(b) by 265 days.

(21) Appl. No.: 10/003,651

(22) Filed: Nov. 14, 2001

(65) Prior Publication Data

US 2002/0109802 A1 Aug. 15, 2002

(30) Foreign Application Priority Data

Feb. 15, 2001 (TW) ........................................ 90202276 U

(51) Int. Cl.[7] ............................................ G02F 1/1333
(52) U.S. Cl. ........................................ 349/58; 348/837
(58) Field of Search ........................... 349/58; 361/683; 348/837; 345/173; 455/90

(56) References Cited

U.S. PATENT DOCUMENTS

| | | | | |
|---|---|---|---|---|
| 4,111,533 A | * | 9/1978 | Nakamura et al. | ............ 349/58 |
| 4,958,889 A | * | 9/1990 | Boyle et al. | ................. 361/683 |
| 5,161,028 A | * | 11/1992 | Kawata et al. | .............. 348/837 |
| 6,118,436 A | * | 9/2000 | Kushita | ....................... 345/173 |
| 2001/0009847 A1 | * | 7/2001 | Kim et al. | ..................... 455/90 |

* cited by examiner

*Primary Examiner*—Huyen Ngo
(74) *Attorney, Agent, or Firm*—Perkins Coie LLP; Paul L. Hickman; David Bogart Dort

(57) ABSTRACT

A slidably detachable mobile phone display unit, which includes a frame and an outer covering, is provided. The frame has a chamber into which a display panel is fixed whereas the outer covering is jointed to the frame in a slidably detachable way. Among which, the outer covering, which is slidably detachable from the frame, can be replaced easily; the hard and strong structure of the frame supports and protects the display panel from being damaged by hits of external sources. In addition, the frame, being small-sized, light and thin, makes it easier for the users to carry the mobile phones with them. The seamless outer covering features the integral beauty of the mobile phone.

16 Claims, 2 Drawing Sheets

SLIDABLY DETACHABLE MOBILE PHONE DISPLAY UNIT

This application incorporates by reference Taiwanese application Ser. No. 90202276, Filed Feb. 15, 2001.

BACKGROUND OF THE INVENTION

1. Field of the Invention

The invention relates in general to a mobile phone display unit, and more particularly to a slidably detachable mobile phone display unit.

2. Description of the Related Art

Along with the busy communication between people, the mobile phone has become an indispensable communication tool for modern people. Through it, people can conveniently communicate with each other no matter wherever they are or whenever they want to. In the pursuit of fashion, the users desire that their mobile phones are conspicuous and different from that of others'. Mobile phone outer coverings of varied patterns have been designed to satisfy users' needs and preferences.

Please referring to FIG. 1, a block diagram of a conventional folding-type mobile phone is illustrated. In FIG. 1, the mobile phone 100 includes an operation base 102 and a display unit 104. The display unit 104, being connected to the operation base 102 through a joint device (not shown in the diagram), can be closed to the base unit 102 or be opened from it. The user inputs signals via the keypad 106 of the base unit 102. The display unit 104 further includes an upper covering member 108, a lower covering member 110 and a Liquid Crystal Display (LCD) 112, which is used to display the status and information of the mobile phone 100. Of which, the click-and-hook joint mechanism is a commonly used joint mechanism which tightly joints the upper covering member 108 and the lower covering member 110 together. The two covering members 108 and 110 are therefore tightly fastened together with joint marks 114 lying between them, forming the outer covering 109 with the LCD 112 enclosed inside it. In addition, there is a window 108 lying in the upper covering member 108, which covers the LCD 112.

In circumstances when the users want to replace the outer covering, or when parts of the circuits of the display unit 104 are damaged or the LCD 112 is out of order, normally the users need to take apart the upper and lower covering members 108 and 110 first before they can replace the outer covering or fix up the damaged circuits of the display unit 104. In order to replace the outer covering 109, i.e., the upper covering member 108 and the lower covering member 110 of the display unit 104, the users always need to take apart the mechanic parts of the click-and-hook joint mechanism using a screwdriver. In case the outer covering 109 is damaged after being taken apart, a new one is required to enclose the internal parts of the display unit 109 wasting both time and money. Besides, the LCD 112, which is enclosed within the outer covering 109, is just sandwiched between the upper covering member 108 and the lower covering member 110. Since the upper covering member 108 and the lower covering member 110 are normally made of fragile solid materials which can hardly support and protect the LCD 112 from hits of external sources. In terms of outlooks, the joint marks 114, which lie between the upper covering member 108 and the lower covering member 110, spoil the integral beauty of the mobile phone 100.

SUMMARY OF THE INVENTION

It is therefore an object of the invention to provide a slidably detachable mobile phone display unit with its outer covering and frame being designed in such a way that the outer covering can be detached from the frame directly and the replacement of the outer covering can be done thereby. As for the frame, its hard and strong structure protects and supports the LCD; and its features of being small, thin and light facilitate the convenience of portability for the users. The seamless outer covering without any joint marks features the integral beauty of the mobile phone.

A slidably detachable mobile phone display unit including a frame and an outer covering is provided according to the object of the invention. The frame has a chamber into which a display panel is fixed. The outer covering and the frame are jointed together in a slidably detachable way.

In addition, a slidably detachable mobile phone display unit including a frame, an outer covering and screws is provided. The frame has tooling holes and a chamber into which a display panel is fixed. The outer covering has openings and screw holes; it joints with the frame in a slidably detachable way and exposes the display panel through the openings. Besides, the screws, passing through the screw holes, are screwed into the tooling holes to fix the frame and the outer covering together.

BRIEF DESCRIPTION OF THE DRAWINGS

Other objects, features, and advantages of the invention will become apparent from the following detailed description of the preferred but non-limiting embodiments.

The description is made with reference to the accompanying drawings in which.

DESCRIPTION OF THE PREFERRED EMBODIMENT

Regarding the design of the display unit of a folding-type mobile phone, the invention assembles the mobile phone display unit using a frame and an outer covering.

The outer covering can either be jointed to the frame using a slidably detachable design or a fixed one. Protecting and supporting the display panel by means of a frame, whose hard and strong structure is light and thin, the size and manufacturing cost of the display unit can be reduced. The joint marks can even be avoided featuring the integral beauty of the mobile phone.

Figure 1:
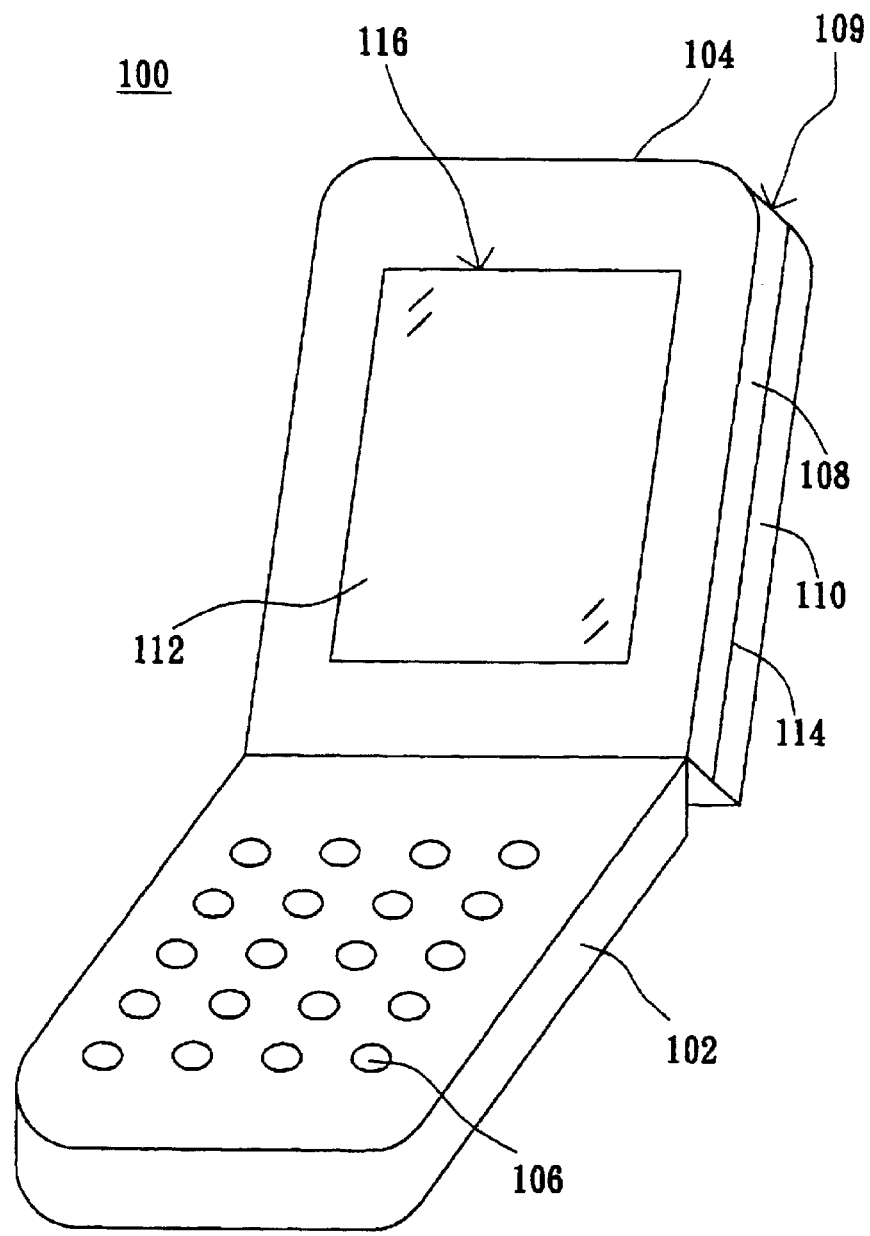
FIG. 1 is a schematic diagram of a conventional folding-type mobile phone.
Figure 2:
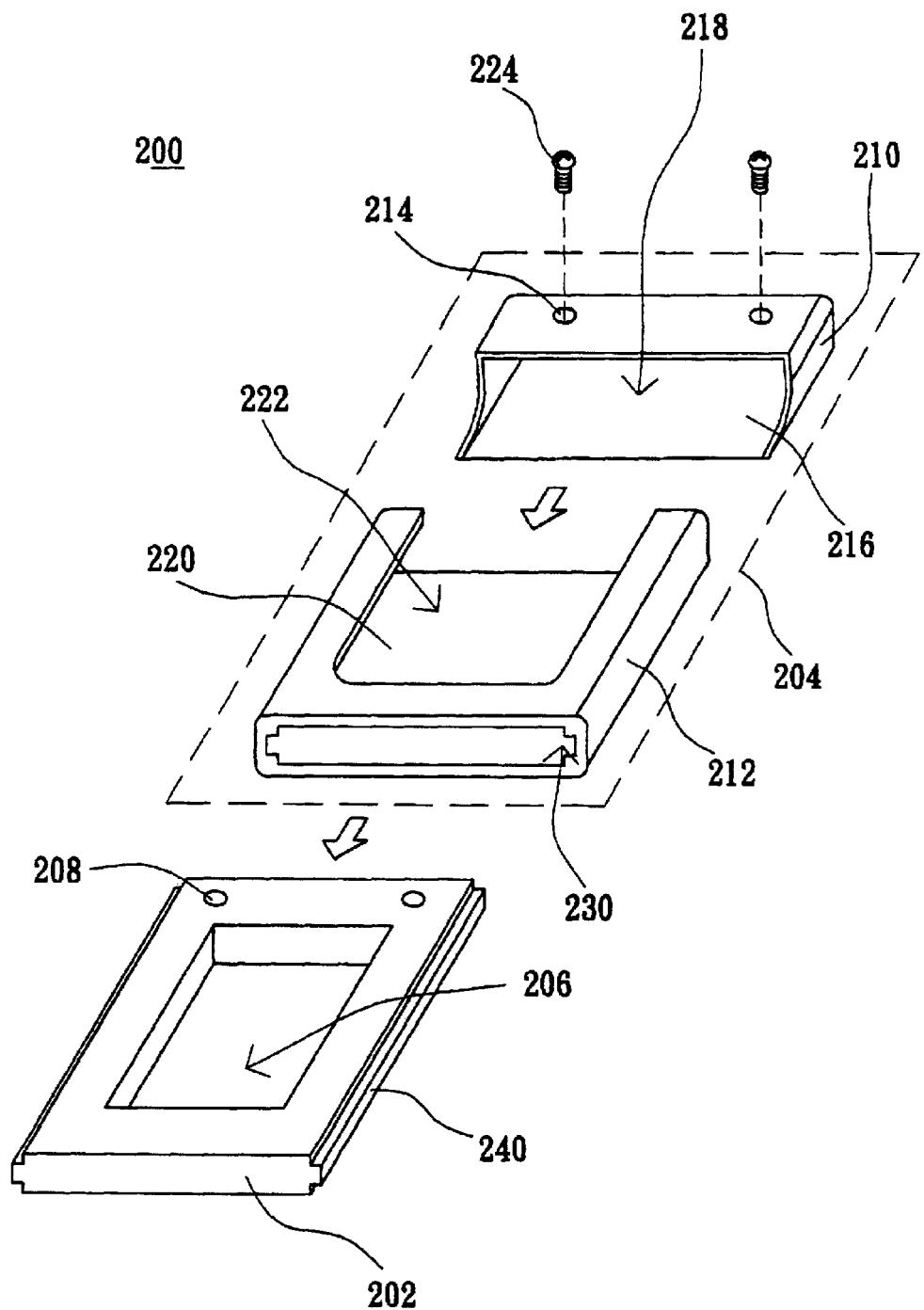
FIG. 2 is an exploded diagram of a slidably detachable mobile phone display unit according to a preferred embodiment of the invention.

Referring to FIG. 2, an exploded diagram of a slidably detachable mobile phone display unit is illustrated. The display unit 200 as shown in FIG. 2 includes a frame 202 and an outer covering 204. The outer covering 204 can be directly jointed to the frame 202 in a slidably detachable way. The frame 202 has a chamber 206 and a number of tooling holes 208. The number of the tooling hole 208, for instance, can be two. The chamber 206 can be used to accommodate a display panel such as an LCD. The frame 202 according to the design of the invention protects and supports LCD. The outer covering 204 includes an upper joint casing 210 and a lower joint casing 212. Of which, the upper joint casing 210 has a number of screw holes 214 corresponding to the tooling holes 208, an extension section 214 and an upper opening 218. The number of the screw holes 214 is two for instance. Besides, the lower joint casing 212 has a junction section 220 and a lower opening 222. Whereas the junction section 220 can joint with the extension section 216; the upper opening 218 and the lower opening 222 form an opening (not shown here) allowing the LCD to be exposed from the outer covering 204.

The frame 202 can be encased in the outer covering 204 by following the following procedures. Firstly, match the guiding slot 230 of the lower joint casing 212 with the sliding channel 240 of the frame 202 and then slip the guiding slot 230 alongside the sliding channel 240 according to the direction of the arrow sign shown in FIG. 2. Next, let the extension section 216 of the upper joint casing 210 be fastened to the junction section 220 of the lower joint casing 212 according to the direction of the arrow sign as well. Finally, the screws 224, passing through the screw holes 214 on the upper joint casing 210, are screwed into the tooling holes 208 on the frame 202 fastening the outer covering 204 and the frame 202 firmly. However, the outer covering 204 can be detached from the frame 202 by simply reversing the above procedures.

As a consequence, if the users desire to detach the outer covering 204 from the frame 202 and replace it with a stylish one, they only need to follow the above procedures accordingly. It is noteworthy that the outer covering 204 can be formed in a unity of the upper joint casing 210 and the lower joint casing 212 without losing its original function for being able to be slidably detachable from the frame 202 and replaced accordingly. The outer covering 204 with varied designs of outlook is made of plastic materials. Since the structure of the frame 202 must be hard and strong enough to protect and support the LCD, the frame 202 can be made of engineering plastics or formed through the die-casting process using aluminum or magnesium.

The outer covering 204 and the frame 202 are designed such that the outer covering 204 can be slidably detached from and replaced on the frame 202 directly; whereas the frame, which is hard and strong, protects and supports the LCD. Furthermore, because of the small-sized, thin and light features of the frame 202, it provides the users more convenience when carrying the mobile phones. The seamless outlook of the outer covering features the integral beauty of the mobile phone.

The slidably detachable mobile phone display unit according to the abovementioned preferred embodiments facilitates convenient replacement of the outer coverings by a design allowing the outer covering to be slidably detachable from the frame. The frame, being hard and strong, support and protect the display panel from being damaged by hits of external sources. In addition, the frame, being small-sized, light and thin, makes it easier for the users to carry the mobile phones with them. Moreover, the seamless outlook of the outer covering without any joint marks features the integral beauty of the mobile phone.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slidably detachable mobile phone display unit, comprising:
   a frame, which comprises a chamber into which a display panel is fixed and has a tooling hole; and
   an outer covering, which is jointed to the frame in a slidably detachable way, the outer covering having a screw hole corresponding to the tooling hole and comprising:
   an upper joint casing with the screw hole, an extension section and an upper opening; and
   a lower joint casing with a junction section and a lower opening, wherein the junction section joins up with the extension section allowing the lower opening to form an opening with the upper opening;
   wherein the outer covering is fastened to the frame using a screw passing through the screw hole and the tooling hole.

2. The mobile phone display unit according to claim 1, wherein the display panel is a Liquid Crystal Display (LCD).

3. The mobile phone display unit according to claim 1, wherein the frame further comprises a sliding channel; the outer covering further comprises a guiding slot corresponding to a the sliding channel of the frame and the outer covering is slidably detachable from the frame by means of the guiding slot and the sliding channel.

4. The mobile phone display unit according to claim 1, wherein the frame is made of engineering plastics.

5. The mobile phone display unit according to claim 1, wherein the frame is formed through a die-casting process using aluminum.

6. The mobile phone display unit according to claim 1, wherein the frame is formed through a die-casting process using magnesium.

7. A slidably detachable mobile phone display unit, comprising:
   a frame which comprises a tooling hole and a chamber into which a display panel is fixed;
   an outer covering which comprises an opening and a screw hole, is jointed to the frame in a slidably detachable way with the display panel being exposed through the opening; and
   a screw, having been screwed into the tooling hole through the screw hole, fastens the frame and the outer covering.

8. The mobile phone display unit according to claim 7, wherein the display panel is a Liquid Crystal Display (LCD).

9. The mobile phone display unit according to claim 7, wherein the frame further comprises a sliding channel; the outer covering further comprises a guiding slot corresponding to the sliding channel of the frame; the outer covering is slidably detachable from the frame by means of the guiding slot and the sliding channel.

10. The mobile phone display unit according to claim 7, wherein the outer covering further comprises:
    an upper joint casing which has the screw hole, an extension section and an upper opening; and
    a lower joint casing which has a junction section and a lower opening; of which, the junction section can be jointed to the extension section such that the lower opening forms the opening of the outer covering with the upper opening.

11. The mobile phone display unit according to claim 7, wherein the frame is made of engineering plastics.

12. The mobile phone display unit according to claim 7, wherein the frame is formed through a die-casting process using aluminum.

13. The mobile phone display unit according to claim 7, wherein the frame is formed through a die-casting process using magnesium.

14. A mobile phone display unit, comprising:
    a frame having a chamber into which a display panel is fixed;
    an outer covering having an opening, wherein the frame and the outer covering are joined in a slidably detachable way with the display panel being exposed through the opening; and a fastener, which fastens the frame with the outer covering when the frame and the outer covering are joined.

15. The mobile phone display unit according to claim 14, wherein the frame further comprises a sliding channel; the outer covering further comprises a guiding slot corresponding to the sliding channel; and the outer covering is slidably detachable from the frame through the guiding slot and the sliding channel.

16. The mobile phone display unit according to claim 14, wherein the outer covering further comprises:

an upper joint casing having an extension section and an upper opening; and a lower joint casing having a junction section and a lower opening wherein the lower opening and the upper opening form the opening of the outer covering when the junction section and the extension section are joined.

* * * * *